US012095336B2

(12) United States Patent
Meuters et al.

(10) Patent No.: US 12,095,336 B2
(45) Date of Patent: Sep. 17, 2024

(54) DRIVE UNIT FOR MOTOR VEHICLE APPLICATIONS

(71) Applicant: Kiekert AG, Heiligenhaus (DE)

(72) Inventors: Stephan Meuters, Korschenbroich (DE); Thomas Hülsmann, Rohrbach a.d. Ilm (DE); Carsten Fuchs, Essen (DE)

(73) Assignee: Kiekert AG, Heiligenhaus (DE)

(*) Notice: Subject to any disclaimer, the term of this patent is extended or adjusted under 35 U.S.C. 154(b) by 284 days.

(21) Appl. No.: 17/637,109

(22) PCT Filed: Aug. 17, 2020

(86) PCT No.: PCT/DE2020/100714
§ 371 (c)(1),
(2) Date: Feb. 22, 2022

(87) PCT Pub. No.: WO2021/037307
PCT Pub. Date: Mar. 4, 2021

(65) Prior Publication Data
US 2022/0286010 A1    Sep. 8, 2022

(30) Foreign Application Priority Data

Aug. 27, 2019    (DE) .................... 10 2019 122 919.7

(51) Int. Cl.
*H02K 5/16* (2006.01)
*E05B 81/06* (2014.01)
*E05B 81/26* (2014.01)

(52) U.S. Cl.
CPC ............. *H02K 5/161* (2013.01); *E05B 81/06* (2013.01); *E05B 81/26* (2013.01)

(58) Field of Classification Search
CPC ......... H02K 5/161; E05B 85/02; E05B 81/06; E05B 81/26
(Continued)

(56) References Cited

U.S. PATENT DOCUMENTS 5,503,441 A * 4/1996 Schwaiger .............. E05B 81/66
292/144
5,714,815 A * 2/1998 Fritzinger .............. H02K 7/116
446/431
(Continued)

FOREIGN PATENT DOCUMENTS

DE    1638213 A1    4/1971
DE    8535099 U1    4/1986
(Continued)

OTHER PUBLICATIONS

International Search Report mailed Nov. 4, 2020, for priority International Patent Application No. PCT/DE2020/100714.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A drive unit for motor vehicle applications, in particular to a locking system drive unit. The latter has an enclosure consisting substantially of a housing and cover. In addition, an electric motor is realized inside the enclosure. The electric motor is receiving with its two motor bearings in associated cutouts in the housing and is fixed by joining together the housing and the cover. According to the invention, the housing and/or the cover have/has fixing anchors in a central region that are arranged on both sides of the cutouts.

12 Claims, 2 Drawing Sheets

(58) Field of Classification Search
USPC .......................................................... 292/201
See application file for complete search history.

(56) References Cited

U.S. PATENT DOCUMENTS

| | | | | |
|---|---|---|---|---|
| 6,296,284 | B1 * | 10/2001 | Weischedel | B60H 1/00528 |
| | | | | 220/4.24 |
| 2001/0017495 | A1 * | 8/2001 | Sato | H02K 5/161 |
| | | | | 310/67 R |
| 2015/0035300 | A1 * | 2/2015 | Taylor | E05B 9/00 |
| | | | | 74/89 |
| 2016/0087508 | A1 * | 3/2016 | Hartmann | H02K 7/18 |
| | | | | 290/1 R |
| 2019/0024415 | A1 * | 1/2019 | Sakurai | E05B 81/06 |
| 2021/0388645 | A1 * | 12/2021 | Katagawa | E05B 81/16 |

FOREIGN PATENT DOCUMENTS

| | | | | |
|---|---|---|---|---|
| DE | 3607426 | A1 | 9/1987 | |
| DE | 102009039406 | A1 | 3/2011 | |
| DE | 102015108733 | A1 * | 12/2016 | ............ E05B 77/34 |
| DE | 102016115045 | A1 | 2/2018 | |
| DE | 102016121187 | A1 | 5/2018 | |
| DE | 102017111397 | A1 | 11/2018 | |
| DE | 202020100098 | U1 * | 3/2020 | ............ E05B 81/25 |
| DE | 102018129748 | A1 * | 5/2020 | |
| DE | 102021118543 | A1 * | 1/2023 | |
| GB | 2536721 | A * | 9/2016 | ............ E05B 77/34 |
| WO | 2003067738 | A2 | 8/2003 | |

* cited by examiner

DRIVE UNIT FOR MOTOR VEHICLE APPLICATIONS

This application is a national phase of International Application No. PCT/DE2020/100714 filed Aug. 17, 2020, which claims priority to German Application No. 10 2019 122 919.7 filed Aug. 27, 2019, the entire disclosures of which are hereby incorporated by reference.

FIELD OF DISCLOSURE

The invention relates to a drive unit for motor vehicle applications, in particular a locking system drive unit, with an enclosure consisting substantially of a housing and a cover, and with an electric motor inside the enclosure, wherein the electric motor is received with its two motor bearings in associated cutouts in the housing and is fixed by joining together the housing and the cover.

BACKGROUND OF DISCLOSURE

Drive units for motor vehicle applications are used for a variety of actuating movements in or on the motor vehicle. These include, for example, a power window drive, electric seat adjustment, mirror adjustment, unlocking and locking for tailgates, front hoods, etc., unlocking and locking for tank flaps, charging flaps in electric or hybrid vehicles, etc., to name just a few. Locking system drive units are preferably involved, i.e. drive units that are used in connection with locking systems, i.e. are designed, for example, as part of a closing drive. Drive units in the interior or on motor vehicle locks and in particular motor vehicle door locks are very particularly preferably involved. With the aid of such drive units, different lock functions are typically defined, for example "locked" or "unlocked" in connection with a central locking system, but also "anti-theft lock on," "anti-theft lock off," "child-proof look on" or "child-proof lock off". In addition, functions such as electric opening of the associated motor vehicle door lock can be implemented with the aid of such locking system drive units.

Depending on the area of application and the purpose for which the known drive units are used, more or less high torques are made available on the output side with the aid of the electric motor and a gear mechanism typically arranged downstream. These torques result in restoring torques which act on the electric motor and which essentially have to be absorbed by the enclosure consisting substantially of a housing and cover. For this purpose, attempts have been made in the prior art known from practice to fix the motor bearings of the electric motor on both sides in associated cutouts in the housing. The joining together of the housing with the cover also contributes to this.

At this point, in practice and in the generic prior art according to DE 10 2016 121187 A1, predominantly circumferential tongue and groove joints between the cover and the housing are realized and implemented. Since the enclosure is usually made of plastic, gaps, deformations, etc. can occur in the region of these tongue and groove joints due to manufacturing tolerances or as a result of the restoring torques to be absorbed. These in turn ultimately lead to the fact that the fixation of the electric motor in the region of its motor bearings can no longer be satisfactorily guaranteed. As a result, the electric motor has a certain "life of its own" inside the housing, which can lead to damage to the downstream gear mechanism or—over a long period of time— even to the complete failure of the drive unit, depending on the load. The invention as a whole seeks to remedy this.

SUMMARY OF DISCLOSURE

The invention is based on the technical problem of further developing such a drive unit for motor vehicle applications and in particular a locking system drive unit in such a way that movements of the electric motor inside the enclosure are reduced to a minimum and consequently the functional reliability and service life can be significantly increased.

To solve this technical problem, a generic drive unit for motor vehicle applications is characterized within the scope of the invention in that the housing and/or the cover have fixing anchors arranged on both sides of the cutouts in a central region.

Each fixing anchor can be designed in two parts with a fixing bar and abutment. Furthermore, the design is such that the fixing bar is provided on the housing and the abutment is provided on the cover. In general, however, it is also possible to proceed in reverse. In this case, the fixing bar is realized on the cover, whereas the abutment is on the housing. In principle, both the cover and also the housing can be equipped with the relevant fixing anchors.

As a rule, however, the design is such that the fixing bar passes through a cavity enclosed by the cover and through the cover itself in the region of a bar opening. The abutment, on the other hand, ensures that the fixing bar is fixed in the region of the bar opening. As a result, an overall cage-like central area is defined according to the invention on both sides of the cutouts for supporting and receiving the two motor bearings of the electric motor. Here, the invention is based on the knowledge that typically two cutouts are provided in the housing for a front and rear motor bearing of the electric motor.

The associated motor bearing of the electric motor is generally accommodated in a form-fitting and/or force-fitting manner within the respective cutout. The housing is joined together with the cover to form the enclosure so that these cutouts and the positive and/or non-positive mounting of the motor bearing of the electric motor that is realized as a result is retained after the housing has been combined with the cover to form the enclosure. With this connection between the housing and the cover, the fixing anchors arranged on both sides of the cutouts are also closed according to the invention, because during this process the fixing bar passing through the cover is fixed in the area of its bar opening with the aid of the abutment on the cover.

Typically, the design is such that two fixing anchors are provided on both sides with respect to each cutout in the housing. As a result of this and because of the two opposite cutouts in the housing with respect to the axial alignment of the electric motor, a total of four fixing anchors are observed as a rule. Since the respective fixing anchors are arranged directly adjacent to the cutout or connect to it, the cage described by the four fixing anchors and already mentioned above is defined in the central area, both in the central area of the housing and in the central area of the cover, i.e. overall in the central area of the enclosure. This cage stiffens the relevant central region and ensures that the electric motor, with its two motor bearings received in the associated cutouts, retains its form-fit and force fit inside the relevant cutout over long periods of time, in particular also in the event that more or less substantial restoring torques act on the electric motor. Herein lie the essential advantages.

The cover and the housing can also be coupled to one another via a peripheral tongue and groove joint. In order that the tongue and groove joint can be adapted to the cage which, as it were, encloses the electric motor and usually consists of four fixing anchors, the tongue and groove joint is usually designed in two parts with a labyrinth surface and a bar engaging therein. The labyrinth surface is generally realized on the edge of the cover, whilst the bar is located on the edge of the housing. In principle, this can also be done in reverse. In this case, the labyrinth surface is provided on the edge of the housing, whilst the bar is arranged on the edge of the cover.

In order, on the one hand, to fix the cage of the electric motor between the fixing anchors in connection with the cutout and, on the other hand, to achieve a tight seal between the housing and the cover, the labyrinth surface is connected via an elastically yielding region to the central region of the cover, which is rigid by comparison. This means that if the labyrinth surface is realized on the cover, the already mentioned elastically yielding region adjoins the labyrinth surface in question. In contrast, the central region of the cover with the cage that is realized and defined at this point and made of the fixing anchors, in connection with the cutouts that receive the electric motor, is designed to be rigid. A low-tolerance mounting between the housing and the cover is also achieved by the elastically yielding area.

In detail, this can be realized and implemented in such a way that the region between the labyrinth surface and the rigid central area of the cover is made of a different plastics material than the central region of the cover. As a rule, however, this elastically yielding region is implemented in a constructive manner in which, for example, indentations or protrusions located in this elastically yielding region in the cover provide the necessary elasticity in this elastically yielding region. In contrast, the rigid central area is designed to be smooth and level. In principle, of course, both constructive measures for the elastically yielding region and material-specific measures can be taken. This means that the elastically yielding region can be realized both by the structural measures already described above and by the use of a plastics material that is softer than the central region.

For example, the central region may be made of a relatively rigid plastics material such as polyamide or another thermoplastics material, whereas elastomers instead of thermoplastics are used for the elastically yielding region.

Finally, according to the invention the cover and/or the housing have one or more raised contact surfaces in the central area. The cage-like character in the central region is supported and reinforced by the use of these contact surfaces. In fact, these contact surfaces can each be placed between the relevant fixing anchor and the cutout on both sides of the cutout, so that a cuboid stiffening cage described overall by the four fixing anchors is provided and implemented in the central region in question, thereby ensuring overall that the cover closing the housing is not deformed in practice in this region, not even when restoring torques act on the electric motor in the course of actuation thereof. As a result, the motor bearings of the electric motor received in the cutouts are fixed satisfactorily in the cutouts, i.e. permanently, over the entire service life of the drive unit according to the invention. This results in increased stability and enhanced functional reliability, which has not previously been observed in the prior art.

BRIEF DESCRIPTION OF DRAWINGS

The invention is explained in greater detail below with reference to drawings which show only one embodiment. In the drawings.

DETAILED DESCRIPTION

Figure 1:
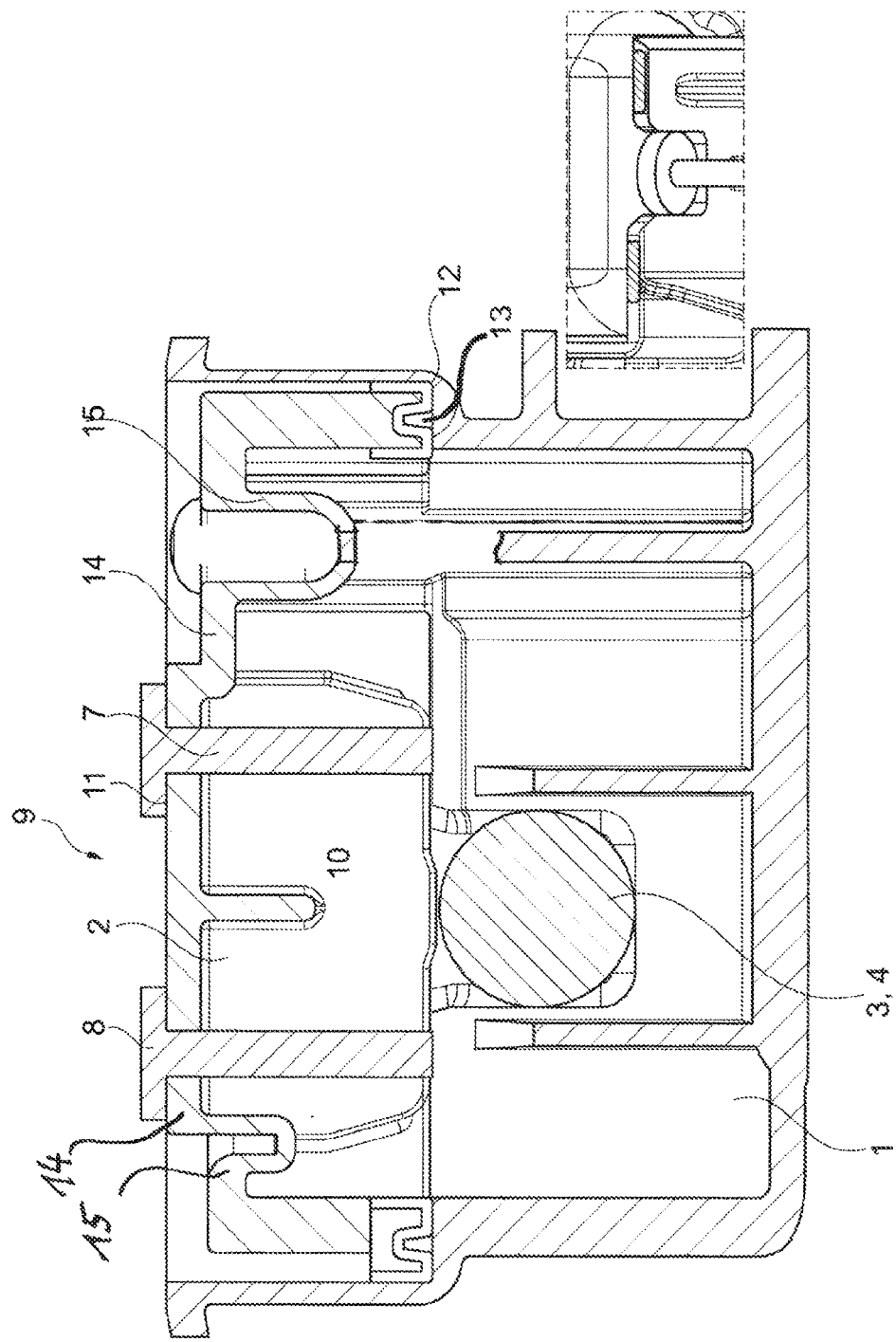
FIG. 1 shows the drive unit according to the invention in a schematic side view, partially in section

In the drawings, a drive unit for motor vehicle applications is shown. In fact, in a non-limiting manner it is a locking system drive unit. In the present case, a drive unit is implemented and illustrated on a motor vehicle lock and in particular a motor vehicle door lock and in connection therewith. In this case the drive unit is received in an enclosure 1, 2. The enclosure 1, 2 is made up of a housing 1 and a cover 2.

Since the drive unit in question is a locking system drive unit and preferably a motor vehicle door lock drive unit, in this case the enclosure 1, 2 is designed as a lock enclosure and consequently the housing 1 is designed as a lock housing 1 and the cover 2 is designed as a lock cover 2. An electric motor 3 is received inside the enclosure 1, 2. The electric motor 3 has a motor bearing 4 in each case at the front and the rear, the circular disk-shaped extension of the motor bearing being received in an axially closed cutout 5, on the one hand, and in an axially open cutout 6, on the other hand. In this case the axially closed cutout 5 corresponds to the rear motor bearing 4, whereas the open cutout 6 receives the front motor bearing 4 of the electric motor 3. The output shaft of the electric motor 3 protrudes from this front motor bearing 4 in the open cutout 6, and an associated gear mechanism, not described in detail below, may be connected to the output shaft.

The electric motor 3 is now received with its two motor bearings 4 in the associated cutouts 5, 6. The two circular disc-shaped extensions of the motor bearings 4 engage in the associated cutouts 5, 6 in a form- and/or force-fitting manner. In addition, the joining of the housing 1 and the cover 2 ensures that the electric motor 3 is fixed inside the enclosure 1, 2.

In order that any restoring torques acting on the electric motor 3 in the course of its closing movements do not lead to tilting or oblique positioning between the housing 1 and the cover 2, according to the invention the housing 1 and/or the cover 2 have fixing anchors 7, 8 arranged on both sides of the cutouts 5, 6.

Figure 2:
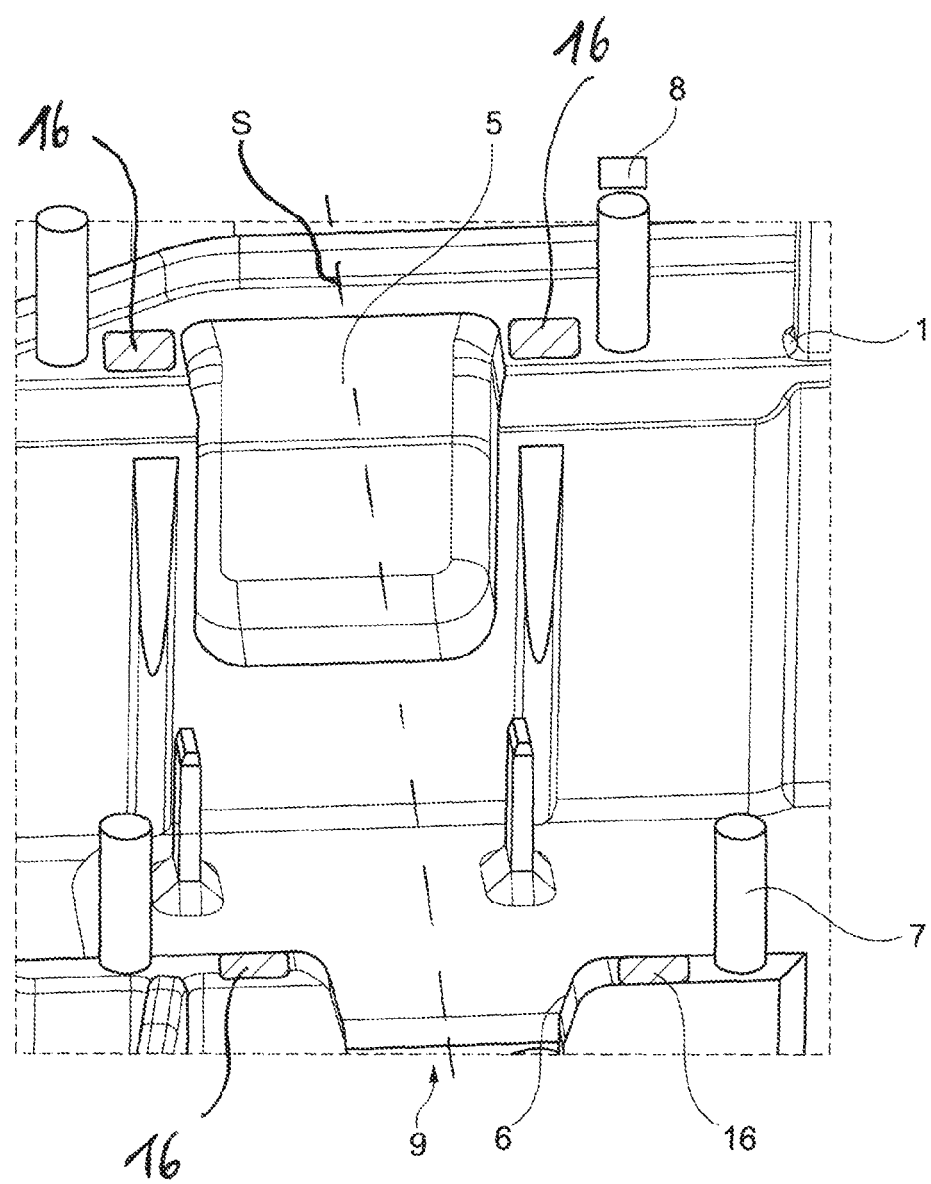
FIG. 2 shows the item according to FIG. 1 in a perspective view of the housing with the cover removed.

From a comparison of FIGS. 1 and 2 it can be seen that each fixing anchor 7, 8 is designed in two parts with a fixing bar 7 and an abutment 8. The fixing bar 7 is provided on the housing 1 or is designed as a component part of the housing 1. Since the housing 1, like the cover 2 in the embodiment, is made of a plastics injection molded part, the fixing bar 7 is an integral part of the housing 1 in the example. The abutment 8 may also be realized as an integral component part of the cover 2 designed as a plastics injection molded part.

The comparison of FIG. 1 and FIG. 2 makes it clear that in each case two fixing anchors 7, 8 are arranged on both sides of the associated cutout 5, 6 directly adjacent thereto. In fact, the two fixing anchors 7, 8 are located on both sides and opposite to a plane of symmetry S, on which the electric motor 3 is also arranged and is received by the two cutouts 5, 6.

Since each of the two fixing anchors 7, 8 is equipped with the cutouts 5, 6 located between them, the four fixing anchors 7, 8 define a central region 9 of the enclosure 1, 2 in the example and according to the embodiment shown. This central area 9 of the housing 1 as well as the cover 2 is designed to be particularly rigid. The predominantly flat character of the housing 1 and of the cover 2 in this central area 9 contributes to this. The cage formed in this way in the central region 9 ensures that the electric motor 3 is satisfactorily and permanently fixed with the aid of the fixing anchors 7, 8 and the cutouts 5, 6 which receive it, as has already been described in the introduction.

In detail, the design is such that the fixing bar 7 passes through a cavity 10 surrounded by the cover 2. In addition, the fixing bar 7 passes through the cover 2 in the region of a bar opening 11. The fixing bar 7 is fixed in the region of the bar opening 11 in question with the aid of the abutment 8.

The housing 1 and the cover 2 are additionally coupled to each other via a peripheral tongue and groove joint 12, 13. The tongue and groove joint 12, 13 is equipped in two parts with a labyrinth surface 12 and a bar 13 which engages therein. The labyrinth surface 12 is located on the edge of the cover 2. In contrast, the bar 13 is provided on the edge of the housing 1. In addition, it will be recognized in particular from the representation in the FIG. 1 that the labyrinth surface 12 is connected via an elastically yielding region 14 to the central region 9 of the cover 2 or of the cover 2 and the housing 1, which is rigid in comparison. This elastically yielding region 14 is defined in the embodiment such that indentations 15 are realized and provided in this region in the cover 2 on both sides of the rigid central region 9. In principle, the elastically yielding area 14 can also be realized and implemented as an alternative or in addition by using a different plastics material in the manufacture of the cover 2.

Typically, the cover 2, like the housing 1, is made of a thermoplastic. In the elastically yielding region 14 there is also the possibility of using an elastomer at this point. As a rule, however, the two indentations 15 shown in FIG. 1 as component parts of the elastically yielding region 14 are sufficient to provide the necessary elasticity for the elastic region 14.

The perspective representation in FIG. 2 also shows that the cover 2 or the housing 1 in the example is additionally equipped with raised contact surfaces 16 in the central region 9. These raised contact surfaces 16 are each located between the relevant fixing anchor 7, 8 and the cutout 5, 6. The raised contact surfaces 16 provided at this point also ensure that the electric motor 3 is particularly rigidly and permanently fixed in the region of the cage defined by the fixing anchors 7, 8 or in the central region 9 and is subjected to a press-fit, so to speak.

As a result, a drive unit or special and low-tolerance mounting of the electric motor 3 in the enclosure 1, 2 or in the lock housing 1 of a motor vehicle door lock is made available, wherein after closure of the lock housing 1 with the aid of the lock cover 2 in conjunction with the fixing anchors 7, 8 a rigid cage practically enclosing the motor 3 is defined, which provides satisfactory mounting and positioning of the electric motor 3 within this cage in conjunction with the associated cutouts 5, 6. As a result, in connection with low tolerances in this region, a particularly permanent and effective fixation of the electric motor 3 is provided, which satisfactorily receives any restoring elements acting on the electric motor 3. In conjunction with the additionally implemented elastic adjustment of the peripheral tongue and groove joint 12, 13 on this rigid central region 9, the required and necessary sealing of the enclosure 1, 2 against external environmental influences is provided at the same time.

LIST OF REFERENCE SIGNS 1 housing
2 cover
3 electric motor
4 motor bearing
5 closed cutout
6 open cutout
7 fixing bar
8 abutment
9 central region
10 cavity
11 bar opening
12 labyrinth surface
13 bar
14 elastic yielding region
15 indentations
16 contact surfaces
S plane of symmetry

The invention claimed is:

1. A lock system drive unit for motor vehicle applications, the locking system drive unit comprising:
   an enclosure defined by a housing and a cover, and an electric motor positioned inside the enclosure,
   wherein:
      the electric motor is received in the enclosure with two motor bearings positioned in associated cutouts in the housing,
      the electric motor is fixed by joining together the housing and the cover,
      at least one of the housing and the cover having a plurality of fixing anchors arranged on both sides of the cutouts in a central region of the enclosure,
      two fixing anchors are provided on both sides with respect to each of the associated cutouts in the housing,
      the fixing anchors are arranged directly adjacent to each of the associated cutouts or connect to each of the associated cutouts to form a cage structure in the central region such that the electric motor is fixed in the cage structure, and
      the housing has raised contact surfaces in the central region that extend from a respective fixing anchor to the cutout on both sides of the cutout.

2. The drive unit according to claim 1, wherein each of the plurality of fixing anchors includes a fixing bar and an abutment.

3. The drive unit according to claim 2, wherein the fixing bar is provided on the housing and the abutment is provided on the cover.

4. The drive unit according to claim 2, wherein the fixing bar passes through a cavity surrounded by the cover and through the cover in a region of a bar opening.

5. The drive unit according to claim 4, wherein the abutment fixes the fixing bar in the region of the bar opening.

6. The drive unit according to claim 1, wherein the cover and the housing are coupled to each other via a peripheral tongue and groove joint.

7. The drive unit according to claim 6, wherein the tongue and groove joint is formed in two parts including a labyrinth surface and a bar which engages in the labyrinth surface.

8. The drive unit according to claim 7, wherein the labyrinth surface is located on an edge of the cover, and the bar is located on an edge of the housing.

9. The drive unit according to claim 7, wherein the labyrinth surface is connected via an elastically yielding region to a central area of the cover, and the central area is more rigid relative to the elastically yielding region.

10. The drive unit according to claim 2, wherein the fixing bar is provided on the cover and the abutment is provided on the housing.

11. The drive unit according to claim 1, wherein the plurality of fixing anchors are positioned symmetrically about a plane on which the electric motor is arranged.

12. The drive unit according to claim 9, wherein the elastically yielding region defines indentations for elastic yielding.

\* \* \* \* \*